March 5, 1935.　　　I. VON K. HOTT　　　1,993,060
LIFTING APPARATUS
Filed Dec. 13, 1933　　4 Sheets-Sheet 1
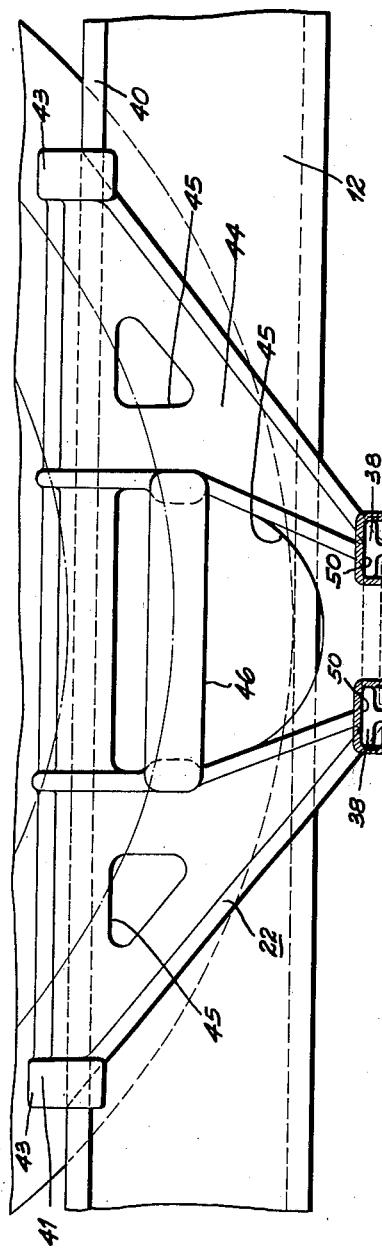
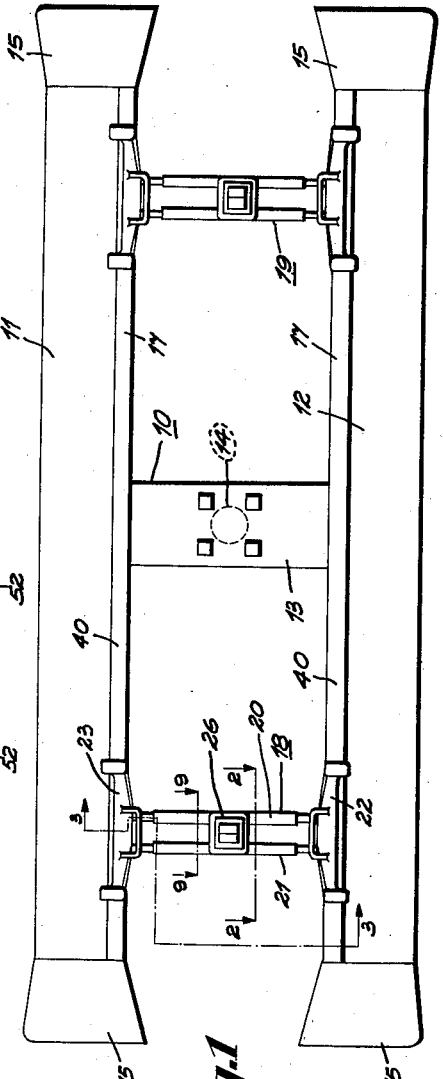
INVENTOR
Jon Von Kert Hott
BY
Maréchal & Noe
ATTORNEY

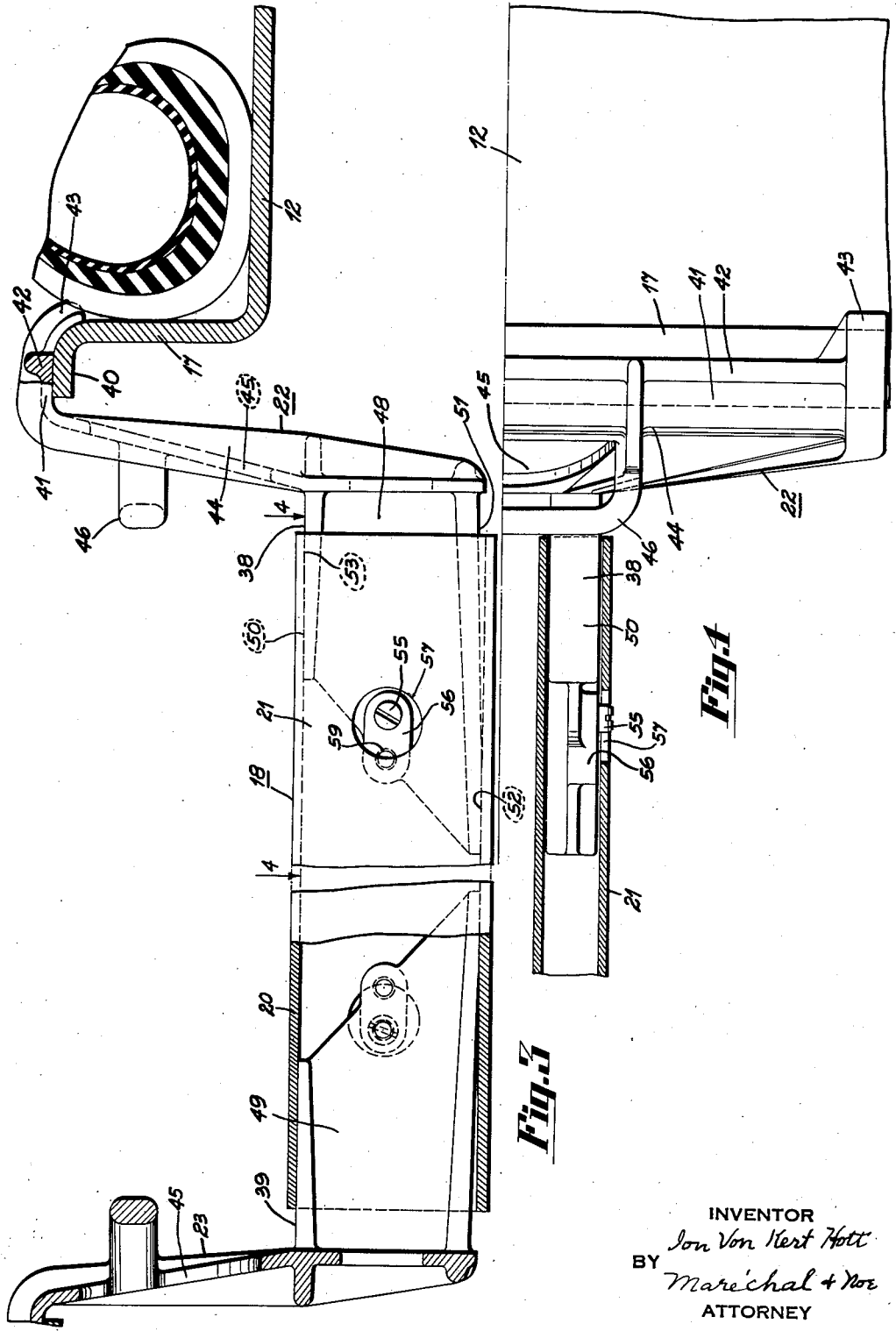

March 5, 1935.  I. VON K. HOTT  1,993,060

LIFTING APPARATUS

Filed Dec. 13, 1933  4 Sheets-Sheet 3

INVENTOR
Ion Von Kert Hott
BY Marechal & Noe
ATTORNEY

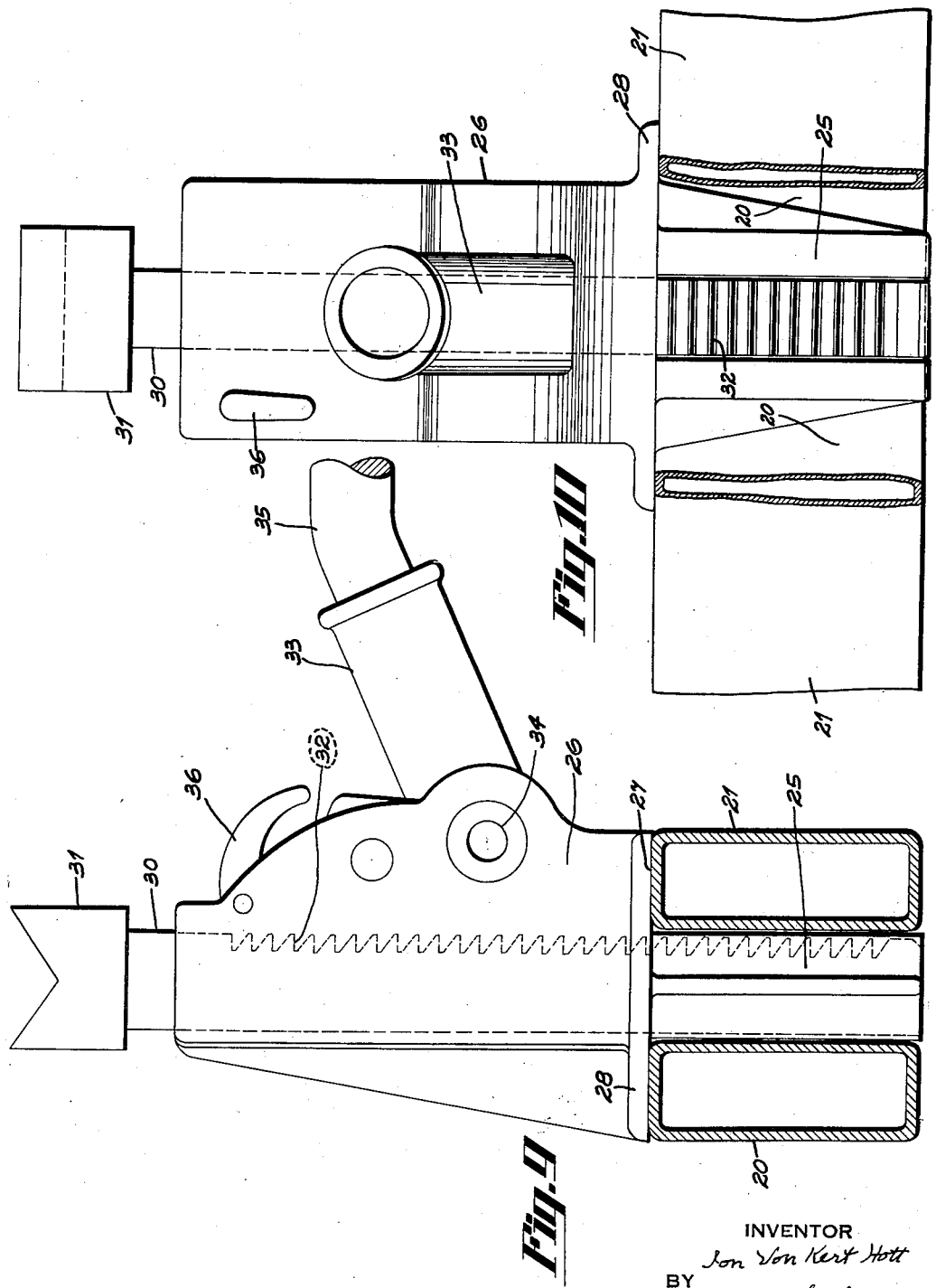

Patented Mar. 5, 1935

1,993,060

UNITED STATES PATENT OFFICE 1,993,060

LIFTING APPARATUS

Ion Von Kert Hott, Dayton, Ohio, assignor to The Joyce-Cridland Company, Dayton, Ohio, a corporation of Ohio Application December 13, 1933, Serial No. 702,165

12 Claims. (Cl. 254—89)

This invention relates to lifting devices for automobiles and the like.

One object of the invention is the provision of a lifting apparatus adapted for use in conjunction with laterally spaced automobile wheel supporting tracks and embodying a jack supporting cradle so arranged as to provide for lateral movement of the jack while the cradle is adapted for longitudinal movement with respect to the tracks so that the jack may be brought to the proper position for application of the load in order that the wheels of the automobile may be raised from the tracks to facilitate greasing, repair or inspection of the wheels or other parts of the automobile.

Another object of the invention is the provision of a lifting cradle of the character mentioned, of simple but strong construction and adapted to be readily removed from and applied to the tracks.

Another object of the invention is the provision of a lifting device embodying a cradle having supporting hangers which rest upon and move along the guard projections of the wheel supporting tracks, only the end portions of the hangers being hooked downwardly and outwardly over the guard projections, these end portions being so spaced apart as to be out of contact with the tire of an automobile supported by the tracks and in contact with one of the guard projections.

Another object of the invention is the provision of a jack supporting cradle device adapted for use with laterally spaced wheel supporting tracks, and comprising a cradle bar having provision for firmly supporting a lifting jack and arranged to guide the lifting jack for movement along the cradle.

Another object of the invention is the provision of a jack supporting cradle embodying a cradle bar the ends of which receive outwardly projecting feet of opposed hangers, the cradle bar and hanger feet having provision affording free but limited relative telescoping movement of the feet and cradle bar.

Other objects and advantages of the invention will be apparent from the following description, the appended claims and the accompanying drawings, in which—

Fig. 1 is a plan view of a roll-on lift having thereon a plurality of the jack cradles embodying the present invention;

Fig. 2 is a section on the line 2—2 of Fig. 1;

Fig. 3 is a section on the line 3—3 of Fig. 1;

Fig. 4 is a section on the line 4—4 of Fig. 3;

Fig. 9 is a vertical section on the line 9—9 of Fig. 1; and

Fig. 10 is a vertical rear elevation of the lifting jack and the cradle bar.

Figure 5:
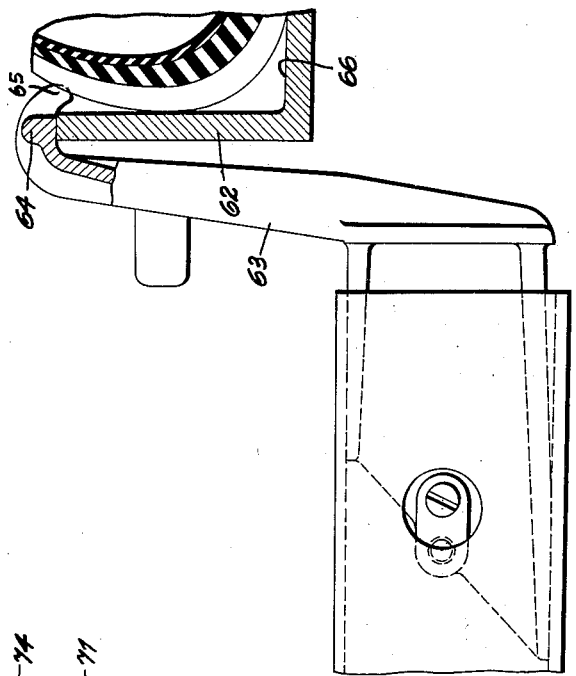
Fig. 5 is a side elevation shown partly in section and illustrating a modified form of construction.

Referring more particularly to the drawings by reference numerals, 10 designates generally a roll-on automobile lift which consists essentially of a pair of runways 11 and 12 connected by a suitable cross-head 13 which is mounted on a lifting or elevating cylinder 14. The ends of the runways are preferably provided with hinged ramps 15 which serve to guide the wheels of an automobile or the like onto the wheel supporting tracks or runway. The mechanism for elevating the runway may be of any suitable character such as a hydraulic pressure mechanism adapted to raise the entire lift to a suitable position for convenient accessibility.

Removably mounted on the wheel guards or projections 17 which extend upwardly on the inside of the wheel supporting tracks is a jack supporting carriage or cradle designated generally by the numeral 18. A second similar carriage 19 may be provided at the opposite end of the tracks, if desired.

The cradle or carriage 18 comprises a base portion formed of a pair of parallel hollow metal tubes 20 and 21, preferably of rectangular cross-section as shown in Fig. 2. The opposite ends of the tubular members 20 and 21 are supported by the two hangers 22 and 23 which are arranged for sliding movement along the guard projections of the runways as will be more fully described. The adjacent sides of the tubular members 20 and 21 provide vertical guide surfaces between which is received the downwardly extending tongue portion 25 of a suitable lifting jack 26. This jack is provided with a seat or base portion 27 which rests on the upper flat sides of both cradle bars or tubes. The base portion of the jack also extends out laterally as indicated at 28. The jack is thus firmly supported against tilting or cocking movement and in such a manner that it can be readily slid along the cradle base so as to be brought to any desired position between the wheel tracks. However, the jack may be readily removed merely by lifting it vertically from the cradle bars and may be as readily applied to the cradle bars.

The lifting or operating mechanism of the jack 26 may be of any suitable character adapted to provide for raising and lowering movements of the lifting bar 30 of the jack, the upper end of which is provided with a suitable cap 31. As herein shown the lifting bar is provided with ratchet teeth 32 adapted to be operated by an oscillatable lever 33 pivotally supported at 34 and operated by a manually moved handle 35. A reversing lever 36 may be positioned to provide for either upward or downward movement of the lifting bar upon reciprocation or oscillation of the handle. The mechanism of the jack may be of the type shown in the prior Patent No. 1,702,442 granted February 19, 1929.

In the form of construction shown in Figs. 1 to 4 inclusive, the cradle bar is supported by the inwardly extending feet 38 of the two hangers 22 and 23, the upper hooked ends of which are adapted to cooperate with the upwardly and outwardly curved extensions 40 of the guard projections 17. The two hangers 22 and 23 are identical in form and interchangeable. As shown, the hanger 22 is of integral construction having an upper hooked portion 41 the center part 42 of which rests on the guard projection but does not extend outwardly thereof and therefore does not project into the space occupied by an automobile wheel resting on the track. At the ends of the upper portion of the hanger the latter is hooked outwardly and downwardly as indicated at 43 so as to retain the hanger from sliding off the guard projection. The hooked end portions 43, however, are so spaced apart, as shown in Fig. 2, as to be out of contact with a normal size tire of an automobile supported by the track even if the tire, at its lower portion which is swelled out laterally due to the weight of the car, is in contact with the guard projection. The increase in tire width at the point of contact of tire and guard projection, that is, at the very bottom of the tire, provides some small clearance space between the tire and guard projection adjacent the hooked ends 43; and as the tire width decreases as the tread is approached it will be apparent that the distance between the hooked ends 43 may be even less than the tire radius without necessitating engagement of the ends 43 and the tire. The cradle may therefore be readily applied to the guard projection of the track even if one of the automobile wheels is closely adjacent the guard projection, and particular care therefore need not be exercised in centering the automobile with respect to the tracks when the automobile is driven on the lift. The construction as just described of course prevents injury to an automobile tire that might otherwise be caused by the supporting portions of the hangers digging into the tire when the cradle is in use.

The body portion 44 of the hanger extends downwardly, being provided with suitable lightening holes 45 and a grip or handle 46 centrally arranged to facilitate the handling of the device. The foot 38 comprises two spaced portions 48 and 49 having outside dimensions very slightly smaller than the inside dimensions of the tubular members 20 and 21, which are adapted to receive the foot portions 49 and 48 respectively. As shown in Fig. 3, the upper and lower surfaces 50 and 51 of the foot portions are slightly inclined relatively so that the vertical height of the foot is somewhat less at the end of the cradle bar than at the inner end of the foot. The upper surface 38 being substantially horizontal while the lower surface is inclined upwardly and outwardly throughout the major portion of its length although the inner end of the surface 51, as indicated at 52 is preferably horizontal. This construction affords a firm support for the cradle bars or tubes inasmuch as the entire hanger swings sufficiently on the guard projection (due to the weight of the jack and the weight of the cradle base) in order that the outer portion 53 of the foot and the inner portion 52 at the lower end of the foot will be in firm contact with the upper and lower inside surfaces of the tubular members of the cradle base. This construction, however, affords convenient separation of the cradle bar tubes from the hanger feet when desired. Normally the cradle bar tubes, which are similar in form and interchangeable, are held on the hangers so that free but limited movement of the hanger feet in the cradle bars is provided for. As shown, a screw 55 is threaded in a boss 56 provided on the hanger foot, the head of the screw being received in a large hole 57 in the outer side wall of the cradle tube, this hole being of such size as to limit the endwise movement of the hanger foot with respect to the tube but cooperating with the head of the screw to prevent separation of the parts when the cradle device is removed from the tracks of the lift. As shown in Fig. 3, the boss 56 is elongated in form and is provided with two tapped holes 59 either of which may receive the screw, this construction permitting the screw to be applied in such position as to give the desired length between the hangers and making the apparatus suitable for use with different tracks of different spacing. The limited telescoping movement of the hangers with respect to the cradle bar permits free sliding movement of the entire cradle along the guard projections of the tracks even if the guard projections are not uniformly spaced apart throughout their entire lengths. This telescoping movement afforded between the hangers and the cradle bar also permits the operator to lift one side of the cradle so as to raise one hanger from the guard projection after which he can readily shorten the length of the cradle without manipulating any bolts or screws in order to remove the cradle from the tracks. However, when he removes the cradle from the tracks the various parts of the cradle will not fall apart as the heads of the screws 55 will prevent separation of the cradle base and its attached hangers.

It will now be apparent that an automobile may be driven on the supporting tracks and the entire automobile lifted by raising the tracks bodily. The crade may then be applied to the tracks and the tongue of the jack inserted between the cradle bar members. The jack may be readily moved to proper position along the cradle base and the wheels of the automobile may then be lifted from the tracks in order to facilitate tire inspection or removal or other desired operations. Where two cradle members are employed, one for each end of the track, both ends of the car may be lifted at the same time so as to free all four wheels, and it will be apparent that the wheels may be lifted from the tracks in any vertical position of the lift.

While a single jack may be used on a cradle, for application to the differential housing, it is also contemplated that a pair of jacks may be used on any cradle in order that the two rear wheels for example of the automobile may be lifted from the tracks by applying the lift forces at points spaced from the longitudinal central axis. Thus the two rear wheels may be lifted for greasing purposes, for example, while the differential gear is being changed. The cradle is adapted for the support of more than one jack inasmuch as it is provided with long guide surfaces, and where two jacks are used it is apparent that either one may be moved to any desired position along the cradle to be brought closer to or further from a guard projection of the track.

Figure 6:
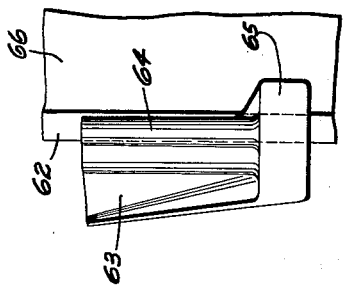
Fig. 6 is a top plan view of a portion of Fig. 5 showing the end of the hanger member.

Figs. 5 and 6 show a modified form of construction in which the guard projections 62 of the vehicle lift are not flanged outwardly. The hangers 63 are each provided with a central supporting portion 64 which rests upon the upper end of the guard projection, while only the ends 65 of the hanger project out into the space above the track 66, the projecting ends 65 being so spaced as to be out of contact with a tire which rests against the projection 62. Otherwise the construction is similar to the form of the invention first described.

Figure 7:
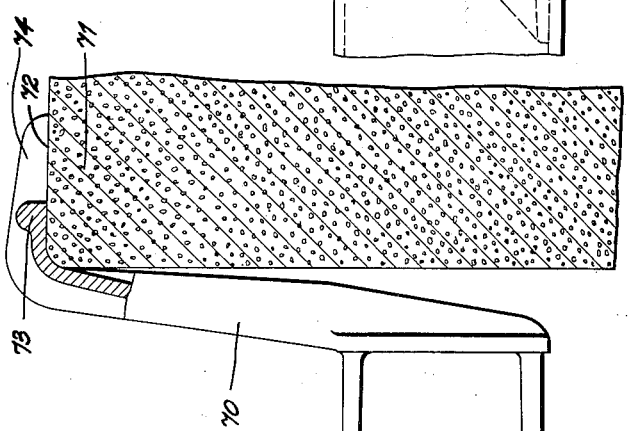
Fig. 7 is a side elevation of another modification of the invention.
Figure 8:
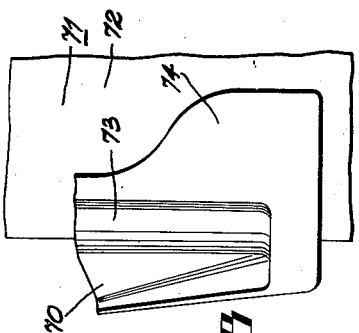
Fig. 8 is a top plan view of an end portion of the hanger shown in Fig. 7.

Fig. 7 shows a hanger 70 adapted for use with the guard projections 71 of a pit. The upper end of each hanger rests on the top surface 72 defining the pit sides, the central portions of the hanger hook, as indicated at 73 affording a firm support, while the ends 74 of the hanger project outwardly considerably further and prevent accidental displacement of the cradle from the supporting walls of the pit. The inwardly extending foot of the hanger is similar in construction to the form of the invention first described except that the tubular cradle members are provided with several holes 76 any one of which may receive the head 77 of the screw which is threaded in the foot of the hanger. The cradle and the jack construction supported by it otherwise are the same as already described.

While the forms of apparatus herein described constitute preferred embodiments of the invention, it is to be understood that the invention is not limited to this precise form of apparatus, and that changes may be made therein without departing from the scope of the invention which is defined in the appended claims.

What is claimed is:

1. In combination, laterally spaced automobile wheel supporting tracks having inside guard projections, laterally opposed hangers each having an upper hooked portion slidable on the guard projections, a cradle base comprising spaced horizontal rails supported by said hangers, and a lifting jack supported by said cradle base and having a body portion guided between said rails for movement from a central position on the cradle base to a position close to either end thereof, the hooked portion of each hanger having end portions hooked downwardly and outwardly over the guard projection and widely spaced apart longitudinally of the guard projection such a distance as to be out of contact with a tire of an automobile supported by the tracks and in contact with the guard projection.

2. In combination, laterally spaced automobile wheel supporting tracks having inside guard projections, laterally opposed hangers each having an upper hooked portion slidable on a guard projection, a cradle base supported at its ends by said hangers, and a lifting jack supported by said cradle base, the hooked portion of each hanger having central portions resting on the guard projection but not projecting outwardly thereof and having end portions provided well outwardly of the sides of said cradle base and hooked downwardly outwardly of the guard projection and spaced widely apart longitudinally of the guard projection such a distance as to be out of contact with a tire of an automobile supported by the tracks and in contact with the guard projection.

3. In combination, laterally spaced automobile wheel supporting tracks having inside guard projections, laterally opposed integral hangers each having an upper hooked portion slidable on a guard projection, a cradle base opposite ends of which telescopically receive portions of said opposed hangers, and a lifting jack supported by said cradle base, the hooked portion of each hanger having central portions resting on the guard projection but not projecting outwardly thereof and having end portions hooked downwardly outwardly of the guard projection and widely spaced apart longitudinally of the guard projection such a distance as to be out of contact with a tire of an automobile supported by the tracks and in contact with the guard projection.

4. A jack cradle adapted for use with the inside guard projections of laterally spaced automobile wheel supporting tracks comprising opposed hangers each having an outwardly hooked upper portion adapted for sliding movement along a guard projection, a cradle base loosely connected to said hangers for free but limited extension movement of the jack cradle, said cradle base having parallel guide surfaces extending longitudinally thereof, a lifting jack held merely by its own weight on said cradle base and laterally movable therealong from a central position on the cradle base to a position close to the end thereof, said jack having a rigid portion guided between said guide surfaces.

5. A jack cradle adapted for use with the inside guard projections of laterally spaced automobile wheel supporting tracks comprising opposed hangers each having an outwardly hooked upper portion adapted for sliding movement along a guard projection and each having an inwardly extending lower foot, a cradle base having its opposite ends supported by said feet, said cradle base having parallel vertical guide surfaces extending longitudinally thereof, a lifting jack having a flat seat resting merely by its own weight on said cradle base and laterally movable therealong, said jack having a downwardly projecting tongue portion rigid with said seat and guided between the opposed guide surfaces of the cradle base.

6. A jack cradle adapted for use with the inside guard projections of laterally spaced automobile wheel supporting tracks comprising opposed hangers each having an outwardly hooked upper portion adapted for sliding movement along a guard projection and each having a pair of inwardly extending lower feet, a projecting hand grip on each hanger provided between its feet and its hooked upper portion, a cradle base comprising spaced members the ends of which enclose the feet of the hangers, and a lifting jack slidably movable along said cradle base.

7. A jack cradle adapted for use with the inside guard projections of laterally spaced automobile wheel supporting tracks comprising opposed hangers each having an outwardly hooked upper portion adapted for sliding movement along a guard projection and each having an inwardly extending lower foot, the foot of each hanger having upper and lower surfaces which are slightly inclined relatively so that the outer end of the foot is slightly reduced in vertical height, a cradle base comprising spaced members the ends of which enclose the feet of the hangers, and a lifting jack slidably movable along said cradle base.

8. A jack cradle adapted for use with the inside guard projections of laterally spaced automobile wheel supporting tracks comprising opposed hangers each having an outwardly hooked upper portion adapted for sliding movement along the guard projections and each having a spaced parallel pair of inwardly extending feet, a cradle base comprising a pair of spaced parallel tubes each telescopically receiving one foot of each hanger, and a lifting jack resting on said cradle base and laterally movable therealong, said jack having a tongue portion slidably guided between said tubes.

9. A jack cradle adapted for use with the inside guard projections of laterally spaced automobile wheel supporting tracks comprising opposed hangers of similar form and construction each having an outwardly hooked upper portion adapted for sliding movement along a guard projection and each having a pair of parallel inwardly extending lower feet, a cradle base having its opposed ends supported by said feet and comprising a pair of hollow tubes of similar form and construction, the ends of each tube telescopically receiving one of said feet a lifting jack supported by said tubes for movement longitudinally thereof, and means loosely connecting said tubes and the feet of said hangers and providing for free but limited longitudinal movement of said tubes with respect to said feet.

10. In combination, a jack support comprising opposed hangers each having an outwardly hooked upper portion adapted for sliding movement along automobile track guards and each having an inwardly extending lower foot, parallel horizontal rails extending between and supported by the feet of said hangers and spaced apart to provide an unobstructed passageway of uniform width extending between the feet of said hangers, and a lifting jack having a body provided with a horizontally extending seat portion slidable upon said rails and provided with a depending portion extending down between and guided by said rails for movement therealong from a central position on the rails to positions close to either end thereof, and a lifting member vertically movable in said body and extending down into said depending portion when in its retracted position.

11. In combination, a jack support comprising opposed hangers each having an outwardly hooked upper portion adapted for sliding movement along automobile track guards and each having an inwardly extending lower foot, a projecting hand grip on each hanger provided between its foot and its upper hooked portion, parallel horizontal rails between and supported by the feet of said hangers and providing an unobstructed passageway therebetween extending substantially between the foot of one hanger to the foot of the other hanger, and a lifting jack slidably supported on said rails and having a portion extending between and guided by said rails.

12. In combination, a jack support comprising opposed hangers each having an outwardly hooked upper portion adapted for sliding movement along automobile track guards and each having an inwardly extending lower foot, parallel horizontal rails extending between and supported by the feet of said hangers and spaced apart to provide therebetween an unobstructed passageway of substantially uniform width, and a lifting jack having a body provided with a horizontally extending seat portion slidably supported on the top of said rails and provided with a depending portion extending down between and guided by said rails, the lower part of said depending portion having a maximum width which is no greater than the distance between said rails, and a ratchet bar vertically movable in said body and in said depending portion thereof.

ION VON KERT HOTT.